(12) United States Patent
Buijsman

(10) Patent No.: US 7,775,742 B2
(45) Date of Patent: Aug. 17, 2010

(54) CIVIL ENGINEERING COMPARTMENTED ROLLER

(75) Inventor: Petrus Johannes Buijsman, Hillegom (NL)

(73) Assignee: Buysman Holding B.V., Hillegom (NL)

( * ) Notice: Subject to any disclaimer, the term of this patent is extended or adjusted under 35 U.S.C. 154(b) by 247 days.

(21) Appl. No.: 12/093,051

(22) PCT Filed: Nov. 7, 2006

(86) PCT No.: PCT/NL2006/000558

§ 371 (c)(1),
(2), (4) Date: May 16, 2008

(87) PCT Pub. No.: WO2007/055567

PCT Pub. Date: May 18, 2007

(65) Prior Publication Data

US 2008/0267705 A1    Oct. 30, 2008

(30) Foreign Application Priority Data

Nov. 14, 2005  (NL) .................................. 1030416

(51) Int. Cl.
*E01C 19/23* (2006.01)
*E01C 19/26* (2006.01)

(52) U.S. Cl. ..................... 404/122; 404/130

(58) Field of Classification Search ............... 404/122, 404/123, 125–128, 130–132
See application file for complete search history.

(56) References Cited

U.S. PATENT DOCUMENTS

| 3,662,657 A | 5/1972 | Aiuppa |
| 4,861,187 A | 8/1989 | Sinkkonen |
| 5,511,901 A | 4/1996 | Yates |
| 6,554,532 B1 | 4/2003 | Motz et al. |
| 6,764,275 B1 | 7/2004 | Carr |

FOREIGN PATENT DOCUMENTS

| DE | 19539542 A1 | 5/1996 |
| DE | 19648593 A1 | 6/1998 |
| DE | 29914838 U1 | 1/2001 |

*Primary Examiner*—Raymond W Addie
(74) *Attorney, Agent, or Firm*—Hoffmann & Baron, LLP

(57) ABSTRACT

A roller for compacting a subsurface, in particular for road building, comprising a roller body with a central axis. The roller body is made up of a plurality of compartments (2), the compartments (2) being provided distributed in the circumferential direction around the central axis. In particular, each compartment (2) comprises at least one fluid chamber (3). More particularly, the fluid chambers (3) in the compartments (2) are in flow communication.

17 Claims, 4 Drawing Sheets

CIVIL ENGINEERING COMPARTMENTED ROLLER

CROSS-REFERENCE TO RELATED APPLICATIONS

This application is the National Stage of International Application No. PCT/NL2006/000558, filed Nov. 7, 2006, which claims the benefit of Netherlands Application No. NL 1030416, filed Nov. 14, 2005, the contents of which is incorporated by reference herein.

FIELD OF THE INVENTION

The invention relates to a roller for compacting or tamping a subsurface, in particular for road building.

BACKGROUND OF THE INVENTION

For road building and constructing new sports grounds and the like the subsurface is currently provided temporarily with a sand pack. This serves the purpose of making the weight of the sand compact the subsurface. In this process the sand pack presses the water out of the subsurface and compresses the mass of the subsurface. After the desired compaction of the subsurface has occurred, the sand pack is removed again, after which, depending on the envisaged final use, the subsurface can be asphalted, turfed or the like.

The disadvantage here is that large quantities of sand have to be brought in, because a sand pack which is one metre or more thick is often required for this method. It is very labour-intensive to apply this sand pack. Such a sand pack then has to remain there for a long time, in particular between 90 and 450 days, in order to achieve the desired compaction. Finally, the large quantity of sand has to be removed again before the envisaged road, sports ground or the like can be constructed further. All in all, this compacting method is an expensive, laborious and time-consuming process.

As an alternative to the abovementioned method, a different type of compacting body, such as a roller, can also be used for compacting the subsurface. Various rollers with which subsurfaces can be compacted are known. Such rollers generally consist of a metal roller cylinder which is rotatable about a rotary shaft forming part of a vehicle. On top of its own weight, the rolling cylinder is further loaded by a part of the weight of the vehicle. If desired, the roller cylinder is also made heavier from the inside in order to add weight.

For example, U.S. Pat. No. 3,662,657 discloses a turf roller for a tractor, in which cylindrical roller bodies which can replace the rear wheels of the tractor are used. In this case each roller body comprises a roller cylinder containing a concentric water compartment which is filled with water. The roller bodies comprise a central hollow around the axis, by means of which they can be mounted on the respective wheel hubs. The compartment is not filled with water until after the roller bodies have been mounted on the wheel hubs.

The disadvantage here again is that these roller bodies weighted with fluid are still relatively large and are consequently difficult to handle. For types of applications other than rolling turf, such as the abovementioned road building, constructing sports grounds and the like, a greater roller pressure is often required. This would increase the size of a roller according to U.S. Pat. No. 3,662,657 and consequently make the roller even more difficult to handle.

SUMMARY OF THE INVENTION

The object of the present invention is to overcome the abovementioned disadvantages at least partially, or to provide a usable alternative.

This object is achieved by a roller according to claim 1. The roller here comprises a roller body which can be rolled over a subsurface in order to exert a compacting pressure upon it. The roller body is made up of a plurality of compartments extending in the axial direction, which are fitted distributed in the circumferential direction around a central axis. The compartments of the roller are preferably connected to each other in such a way as to be easily detachable, and they can then be assembled and disassembled on site, and can be transported separately from each other. This makes it easy and quick to transport the compartments. As a result, it is possible to assemble roller bodies with a diameter of at least 3 metres, in particular up to as much as 10 metres, without this being an obstacle to rapid and safe transport by road, or making handling on site difficult. Furthermore, this makes it possible to transport the individual compartments along places which are difficult to reach, for example through narrow alleys. In addition to easier transport, the production of the compartments is also generally easier in the event of roller bodies with larger diameters having to be built.

In particular, each compartment comprises at least one fluid chamber. After the desired site has been reached, the compartments can be connected to each other, and one or more compartments can be fully or partially filled with fluid, depending on the desired compacting pressure. With a roller diameter of, for example, 10 metres, a pressure of over 60 tonnes per metre of width can therefore be obtained.

More particularly, the fluid chambers in the compartments are in flow communication with each other. By in addition providing pumping means for pumping fluid between the fluid chambers in the compartments and controlling the pumping means by a control unit, a suitable displacement of fluid between the compartments can produce a force which propels the roller. The control unit here is equipped so that during operation it pumps fluid from a fluid chamber in a compartment which at that moment is lying behind relative to an envisaged roller direction to a fluid chamber in a compartment which at that moment is lying in front relative to an envisaged roller direction. The roller body advantageously now does not need to be propelled by a motor vehicle or the like, but can advantageously operate as a stand-alone unit. It is advantageously easy to select the pump speed—and consequently the propulsion speed—at such a low level that the desired compacting effect can be achieved already after one pass with the roller over the subsurface. It is, of course, also possible to work the subsurface with several passes of the roller.

Further preferred embodiments are described in the subclaims.

The invention also relates to methods for use of the roller according to the present invention.

BRIEF DESCRIPTION OF THE DRAWINGS

The invention will be explained in greater detail with reference to the appended drawing, in which.

DETAILED DESCRIPTION OF PREFERRED EMBODIMENTS

Figure 1:
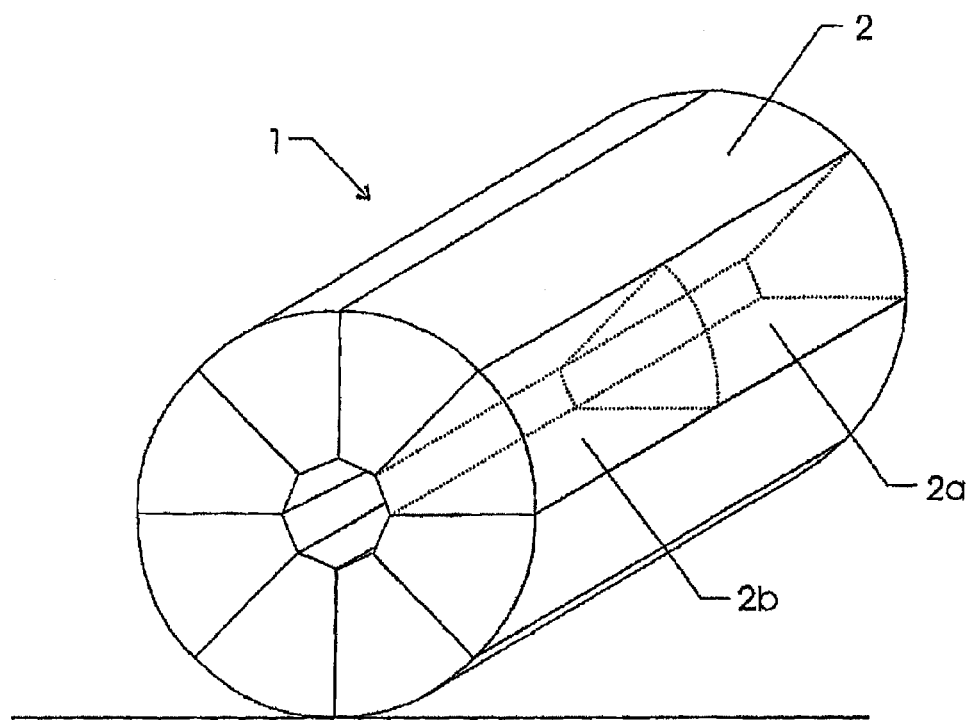
FIG. 1 is a diagrammatic view in perspective of the roller body made up of a plurality of compartments.

In the figures the roller is indicated in its entirety by the reference numeral 1. The roller 1 consists of a plurality of interconnected fluid-tight compartments 2, which through filling with fluid 3' can apply a pressure upon the subsurface. Displacing the fluid 3' between the compartments 2 can produce a force which propels the roller 1.

The roller 1 can exert a great pressure upon one point and can propel itself, so that the sand pack according to the prior art is no longer necessary. For example, a water-filled roller with a 10-metre diameter can deliver a pressure of 78 tonnes per metre of width.

Figure 2:
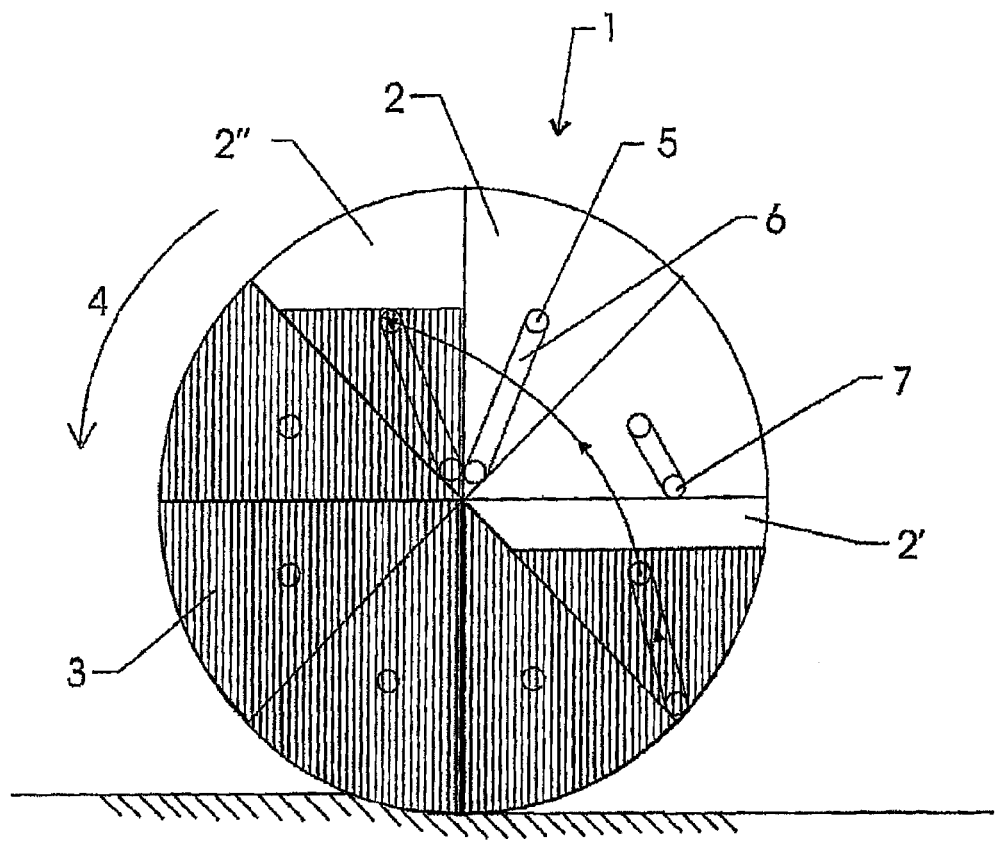
FIG. 2 is a diagrammatic view in cross section of a variant with fluid drive.

The roller 1 can supply energy to the propulsion by in the vertical plane filling more compartments 2 with fluid in one half of the roller 1 than in the other half. The roller 1 will move in the direction 4 of the half with the heavier filling, as indicated in FIG. 2.

All compartments have at least one fluid connection 5 through which the fluid 3' can be pumped into or out of the compartment 2. If the connection 5 is situated on the side of a compartment 2, the lowest point for pumping out can be found by placing a hose 6 with a weighted suction nozzle 7 in the compartment 2.

By means of a control unit (not shown), for example a PLC, a selection can be made from one or more compartments 2' which are to be pumped out and a selection can be made of one or more compartments 2" which are to be pumped full. Connecting the selected compartments 2 to the inlet or outlet of a fluid pump by means of controllable shut-off valves means that the energy can be built to move the roller 1 in the desired direction. Aeration and deaeration are a part of this process.

In order to prevent the roller 1 from falling over, or in order to avoid having structures to prevent this from happening, the width of the roller 1 may have to be greater than its height.

If the compartments 2 are uniformly filled over the full width, the roller 1 will be propelled in a straight line. If the compartments 2 are divided internally into segments 2a, 2b, as can be seen in FIG. 1, the direction of propulsion can be influenced to some extent by uneven filling of the divided compartments 2. The direction of propulsion can also be influenced by connecting rollers to each other, with one roller delivering more forward power than the other.

The compartments 2 can be of different shapes, depending on the application. The roller 1 will propel itself gradually (in a jolting movement) if the compartments 2 are the shape of sectors of a circle which together give the roller 1 a round outside shape like that shown in FIGS. 1 and 2.

The roller will produce a shock in the subsurface if the compartments do not form a round external shape, and after overcoming the dead centre position the roller falls over onto the next compartment.

Figure 3:
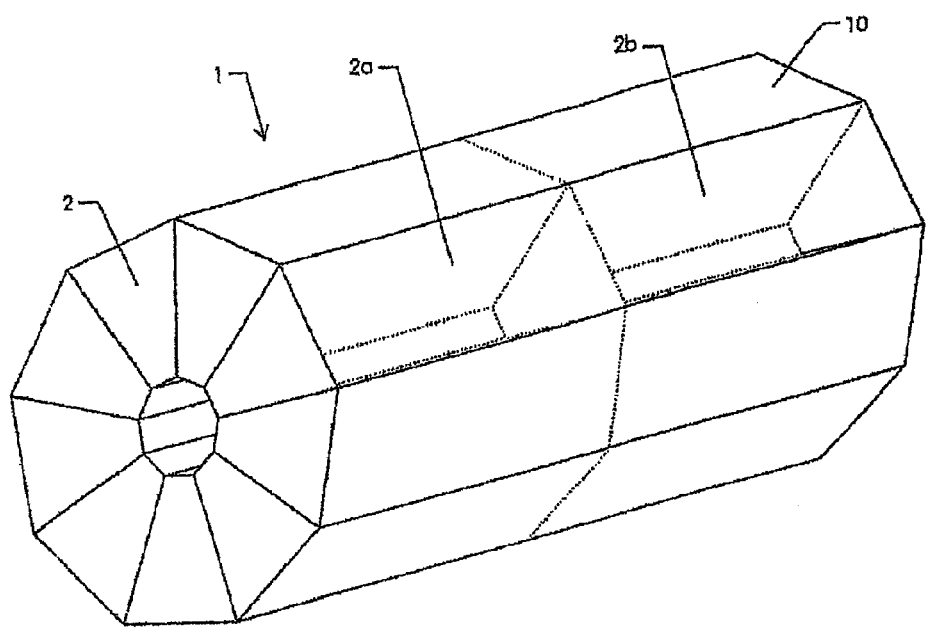
FIG. 3 is a view corresponding to FIG. 1 with flattened parts.

FIG. 3 shows an embodiment in which the compartments 2 comprise flattened outer circumferential walls 10. If the roller 1 propels itself or is propelled during operation, it is advantageous for vibrations to occur in the subsurface as it turns over from the one compartment to the other. These local vibrations contribute to the compaction of the subsurface, as does the shock of the roller turning over from the one compartment to the other.

Figure 4:
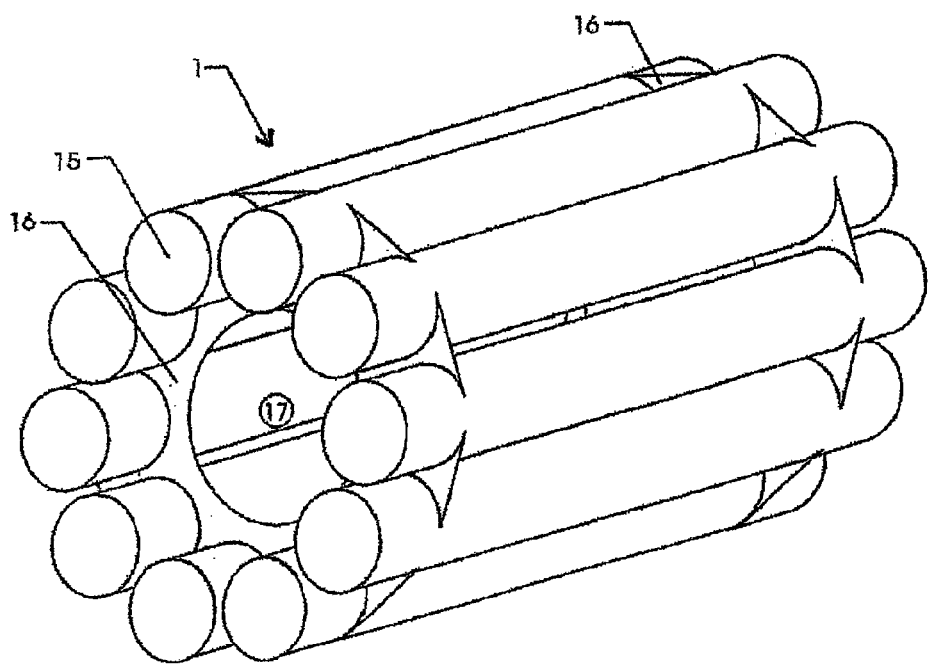
FIG. 4 is a view corresponding to FIG. 1 of a variant with cylindrical compartments.

FIG. 4 shows a variant in which the roller is made up of a plurality of cylindrical compartments 15 mounted on two intermediate frames 16. The compartments 15 are provided with fluid chambers here. In this embodiment also, pumping means or other types of drive devices can be accommodated in the central space 17 left clear between the compartments 15. This means that this variant also can be in the form of a stand-alone unit.

Figure 5:
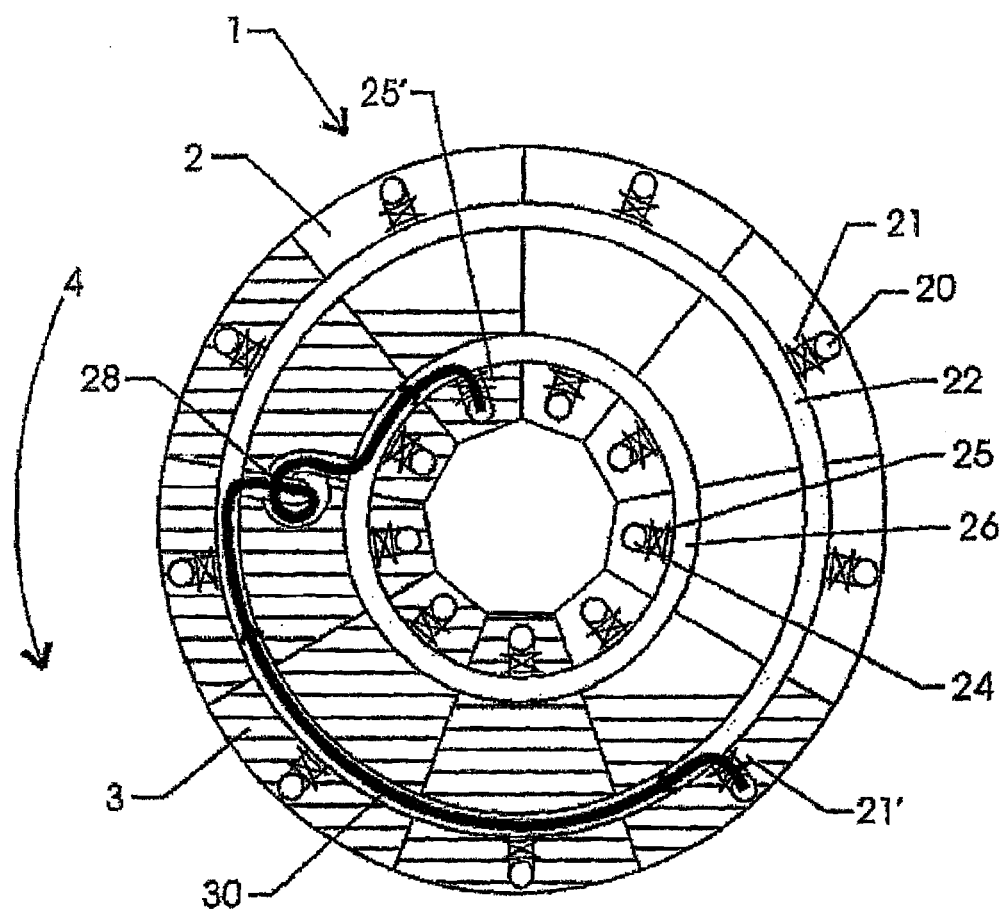
FIG. 5 is a diagrammatic view in cross section of FIG. 1 showing an embodiment of a pumping unit.

It can be seen in FIG. 5 that each fluid chamber 3 of each compartment 2 is provided with a pumping-out connection 20, which is connected by way of a shut-off valve 21 to a pumping-out line 22, and each compartment is also provided with a pumping-in connection 24, which is connected by way of a shut-off valve 25 to a pumping-in line 26. The lines 22, 26 here are in the form of ring lines extending along and/or through the fluid chambers 3. A pump 28 is provided between the pumping-out line 22 and the pumping-in line 26. Flows can be produced between certain compartments 2 by controlling the pump 28 and the shut-off valves 21, 25 in a suitable manner by way of the control unit (not shown). An example of this is given by 30 with pump 28 put into operation and with opened shut-off valves 21', 25'. The appropriate weight shift within the roller 1 will cause the roller 1 to be propelled in the direction 4.

It is also clearly visible in FIG. 5 that the sector-shaped compartments 2 are truncated, so that a clear space is produced in the centre of the roller body. The control unit (not shown), for example, can be accommodated in this space. The truncation further means that material is saved and the height of an individual compartment remains limited. This simplifies transport by, for example, road.

Many variants are possible in addition to the embodiment shown. For instance, the individual compartments can be mounted directly connected to each other on an intermediate frame, or can be held together in another way. The connection is such that the compartments are easy to assemble and disassemble, and is formed, for example, by a sliding connection or a bolted connection. If desired, a plate-shaped element can be fitted around the assembly of the compartments, which plate-shaped element during operation ultimately rests against the subsurface to be worked. The compartments can also be of a different shape, and in the assembled state may rest against each other or be separated. If there are a plurality of compartment segments lying adjacent to each other in the axial direction, said segments can be formed by internally placed partitions. In a variant it is also possible to make the compartment segments completely separate from each other and connect them to each other during assembly. In yet another variant the compartments can also be obtained by partition walls which are placed in a sealing manner inside a sleeve-shaped element and separate the compartments from each other. The pumping means can be formed by an external pumping unit, but can also be accommodated inside the assembly of compartments. The compartments are preferably of the same design. This simplifies production and also the assembly. The fluid used is preferably water, but another fluid or filling agent such as, for example, sand is also possible.

In this way a roller which can exert great pressure upon the subsurface is obtained, with the result that the layers of ground are tamped. If the roller consists of sector-shaped compartments with a round external shape, this will cause a reasonably uniform pressure. If the roller consists of a circle of compartments which do not form a uniform outside, this will cause a pulsating pressure. The roller can be set at different pressures by metering the quantity of fluid present in the roller. By displacing the fluid between compartments, the roller can shift the centre of gravity and move itself as a result. The direction of movement can be adjusted by dividing the compartments up internally and filling these parts unequally. The direction of movement can be adjusted by connecting rollers together and filling the rollers unequally. If water is used as the fluid, this "weight" does not need to be brought in. The roller can be assembled and disassembled, and is movable.

What is claimed is:

1. A roller for compacting a subsurface, in particular for road building, comprising:
    a roller body with a central axis;
    in which the roller body is made up of a plurality of compartments, the compartments being provided distributed in the circumferential direction around the central axis, in which each compartment comprises at least one fluid chamber, in which the fluid chambers in the compartments are in flow communication with each other,
    wherein, pumping means are provided for pumping fluid between the fluid chambers in the compartments, in which a control unit is provided, which control unit is equipped for pumping fluid from a fluid chamber in a compartment which at that moment is lying behind relative to the envisaged roller direction to a fluid chamber in a compartment which at that moment is lying in front relative to the envisaged roller direction.

2. The roller according to claim 1, further comprising drive means for propelling the roller, wherein the drive means are accommodated in the roller body.

3. The roller according to claim 1, wherein the roller body in the axial direction comprises a plurality of compartment segments lying adjacent to each other.

4. The roller according to claim 3, further comprising a control unit, which control unit is equipped for pumping fluid during operation from a fluid chamber in the one compartment segment to a fluid chamber in a compartment segment situated laterally relative thereto.

5. The roller according to claim 2, wherein each compartment comprises an external fluid connection.

6. The roller according to claim 1, wherein the compartments are of a design with the shape of a sector of a circle, viewed in cross section.

7. The roller according to claim 6, wherein the sector shaped compartments are truncated.

8. The roller according to claim 1, wherein the compartments together bound an outer circumferential surface which is substantially cylindrical.

9. The roller according to claim 1, wherein the compartments together bound an outer circumferential surface which comprises non-round parts, in particular flattened parts.

10. The roller according to claim 1, wherein the compartments are fitted distributed in such a way as to be contiguous in the circumferential direction around the central axis.

11. The roller according to claim 1, wherein the assembly of compartments has an external diameter of at least 3 meters.

12. The roller according to claim 1, wherein the compartments are of the same shape.

13. The roller according to claim 1, wherein the assembly of compartments forms an elongated roller body.

14. The roller according to claim 1, wherein the compartments are detachably connected to each other.

15. A method for the use of a roller according to claim 1, comprising the steps of:
    transporting the compartments to a desired site;
    propelling the assembly of compartments over the subsurface to be worked; and
    filling one or more of the compartments with a fluid, in which the step of propelling is supported at least by means of pumping fluid from the one compartment to the other compartment.

16. The method according to claim 15, wherein the fluid is water.

17. The method according to claim 15, wherein the step of transporting is carried out with disassembled compartments, which compartments are assembled to form the roller body after reaching the desired site.

* * * * *